United States Patent
Al Marzouqi et al.

(10) Patent No.: US 10,218,890 B2
(45) Date of Patent: Feb. 26, 2019

(54) DEVICE FOR INHIBITING OPERATION OF AN IMAGE RECORDING APPARATUS

(71) Applicant: Khalifa University of Science and Tehnology, Abu Dhabi (AE)

(72) Inventors: Hamad Al Marzouqi, Abu Dhabi (AE); Khalfan Al Marashda, Abu Dhabi (AE); Mohammed Ali Saif Al Zaabi, Abu Dhabi (AE)

(73) Assignee: KHALIFA UNIVERSITY OF SCIENCE TECHNOLOGY, Abu Dhabi (AE)

( * ) Notice: Subject to any disclaimer, the term of this patent is extended or adjusted under 35 U.S.C. 154(b) by 0 days.

(21) Appl. No.: 14/699,340

(22) Filed: Apr. 29, 2015

(65) Prior Publication Data

US 2016/0323491 A1 Nov. 3, 2016

(51) Int. Cl.
*H04N 5/232* (2006.01)
*H04N 5/225* (2006.01)
*H04N 5/77* (2006.01)

(52) U.S. Cl.
CPC ........... *H04N 5/232* (2013.01); *H04N 5/2251* (2013.01); *H04N 5/772* (2013.01)

(58) Field of Classification Search
CPC ........ G03B 2205/0061; G03B 310/311; G06K 7/10009; G06K 19/00; H04N 5/232; H04N 5/772; H04N 5/2251
See application file for complete search history.

(56) References Cited

U.S. PATENT DOCUMENTS

| | | | | |
|---|---|---|---|---|
| 5,353,350 A * | 10/1994 | Unsworth | ............... | G06F 21/86 257/922 |
| 2004/0032507 A1* | 2/2004 | Mun | .................. | H04N 1/00307 348/207.99 |
| 2006/0291842 A1* | 12/2006 | Tokiwa | .................. | G03B 17/14 396/56 |
| 2007/0080806 A1* | 4/2007 | Lax | ..................... | E05B 73/0017 340/572.1 |
| 2007/0132857 A1* | 6/2007 | Grip | ..................... | H04N 3/1587 348/218.1 |
| 2008/0058006 A1* | 3/2008 | Ladouceur | .......... | H04M 1/0264 455/556.1 |
| 2012/0243093 A1* | 9/2012 | Tonar | .................. | G02B 27/0006 359/507 |

* cited by examiner

*Primary Examiner* — Mekonnen Dagnew
(74) *Attorney, Agent, or Firm* — Hayes Soloway PC

(57) ABSTRACT

There is provided a device for attachment to an image recording apparatus, the device comprising a blocker, attachable to said image recording apparatus, configured to inhibit said apparatus from recording an image when attached thereto; a transducer, connected to the blocker, configured to detect the change of position of the blocker between an attached position, wherein said apparatus is inhibited, and another position; and a controller, connected to the transducer, configured to store the position of the blocker when attached to said image recording apparatus and indicate if the blocker has changed position after it has been attached.

19 Claims, 12 Drawing Sheets

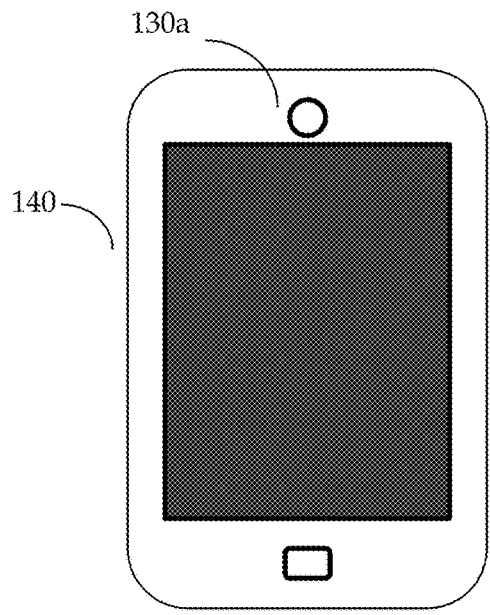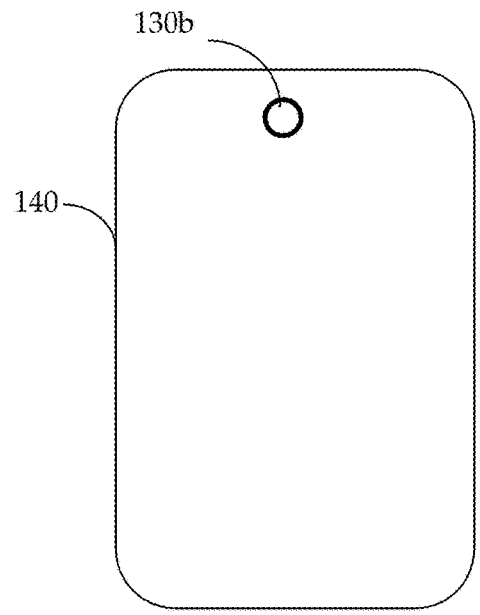
FIG. 5A  FIG. 5B
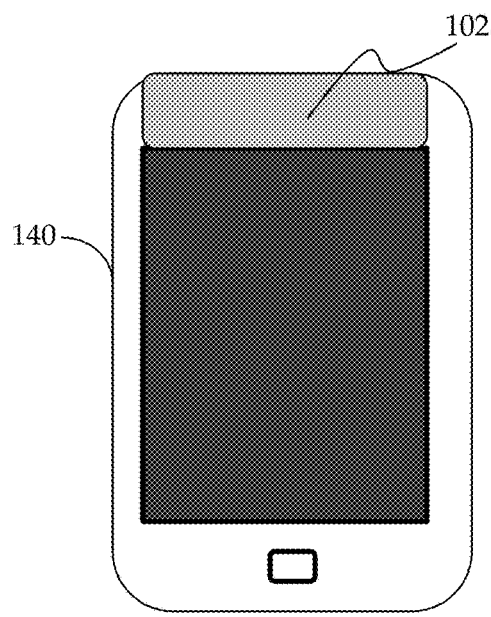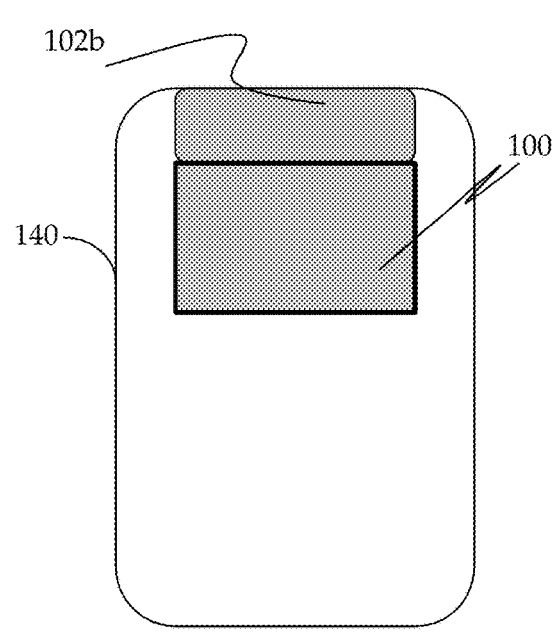
FIG. 5C  FIG. 5D
FIG. 5

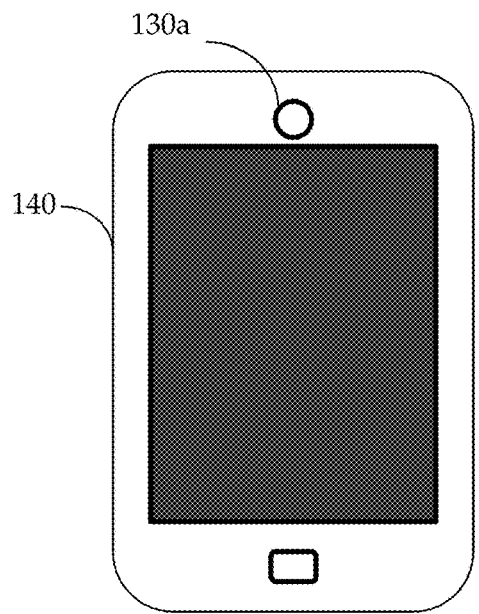 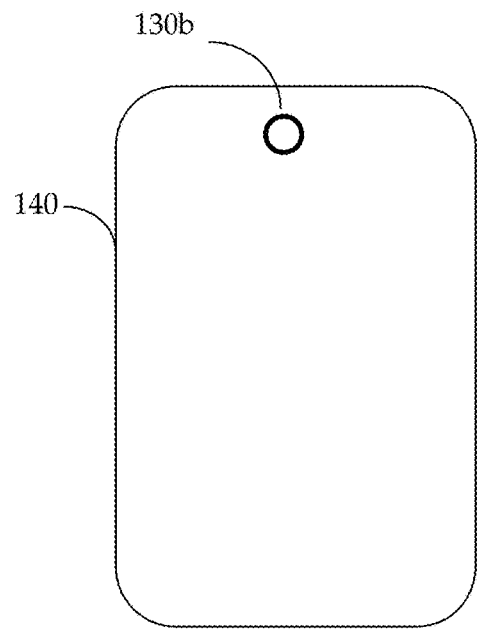
FIG. 7A  FIG. 7B
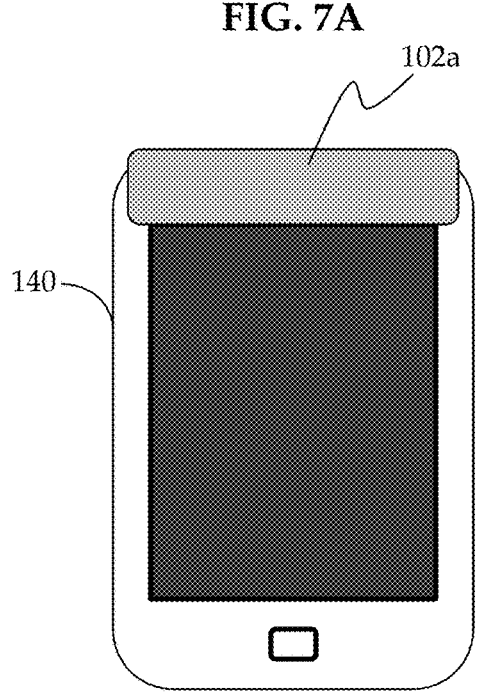 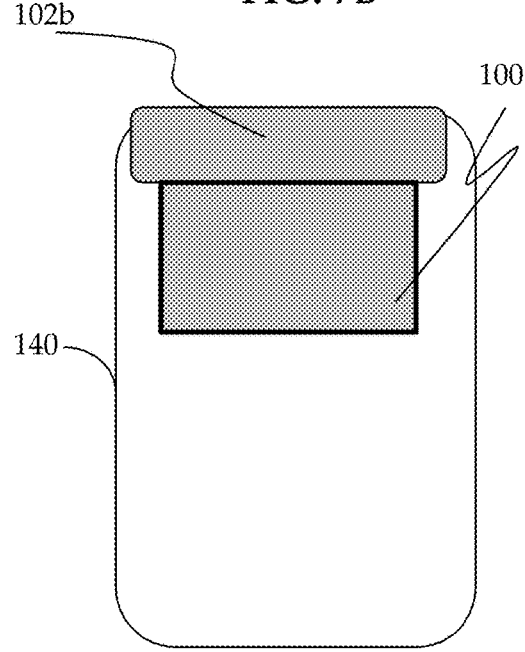
FIG. 7C  FIG. 7D
FIG. 7

DEVICE FOR INHIBITING OPERATION OF AN IMAGE RECORDING APPARATUS

FIELD OF THE INVENTION

The present invention relates generally to camera and image recording devices, and more particularly to a device for inhibiting operation of an image recording apparatus.

BACKGROUND OF THE INVENTION

A camera has become a ubiquitous device occurring in association of many types of other devices or as a standalone device. Most notably, since the advent of smart devices such as a smart phone, camera is available to people at any time and everywhere. Usefulness of a camera for diverse purposes such as information gathering and recreation is well known.

However, circumstances exist where camera usage needs to be restricted. For example, a camera usage is prohibited in and around security and defence establishments. Camera usage also needs to be curbed where confidential data is exchanged such as private seminars or conferences. Usually, the participants of such events are instructed not to take pictures or make videos. However, such methods for restricting camera usage are found to be ineffective because people may not comply.

Other existing solutions include physically blocking a camera by an opaque screen pasted thereon. This solution is ineffective as the person carrying the camera device can easily remove the screen and take illegal pictures and/or videos and put the screen back afterwards.

Further, other existing solutions include switching off the camera or associated camera devices and depositing it in a secure location for the duration of the event. However, generally, camera devices have other functionalities which are also disabled when the camera device is switched off, which is evidently over restrictive. For example, in certain restricted areas pictures and video capturing may be prohibited but there is no restriction on for calling/receiving a voice call. Existing systems and methods either become over restrictive wherein all functionalities of a camera device are restricted or provide no restriction at all.

SUMMARY OF THE INVENTION

Therefore, there exists a need for a device for inhibiting operation of an image recording apparatus. An image recording apparatus is defined to include any type of device capable of capturing and recording images or videos including but not limited to camera devices.

According to a first aspect, a device for attachment to an image recording apparatus has a blocker (can consist of the at least a part of the body of the device or a component attached or connected to the body), attachable to said image recording apparatus, configured to inhibit said apparatus from recording an image when attached thereto. A transducer, connected to the blocker, is configured to detect the change of position of the blocker between an attached position, wherein said apparatus is inhibited, and another position. A controller or an indicator, connected to the transducer, is configured to store the position of the blocker when attached to said image recording apparatus and indicate if the blocker has changed position after it has been attached.

The blocker can be a sticker adapted for sticking over one or more image recording apparatus lens or sensor. The sticker can include paper and/or plastic and/or rubber.

The transducer can include a sensor configured to detect movement of the blocker from the attached position. The blocker can be attachable to the image recording apparatus such that removal of the blocker requires at least a portion of the blocker to be bent, leveraged or folded. The transducer can include a piezoelectric sensor.

The piezoelectric sensor can be adapted to be subject to a mechanical force, upon tampering, and to react to said mechanical force when the blocker moves from the attached position to another position.

The piezoelectric sensor can be a bending piezoelectric sensor. The mechanical force can be in the form of a bending force applied on the sensor while moving the blocker from the attached position to the other position.

According to another aspect, the invention resides in a device for attachment to an image recording apparatus, the device comprising: a blocker, attachable to said image recording apparatus, configured to inhibit said apparatus from recording an image when attached thereto; a transducer, connected to the blocker, configured to detect the change of position of the blocker between an attached position, wherein said apparatus is inhibited, and another position; and a controller, connected to the transducer, configured to store the position of the blocker when attached to said image recording apparatus and indicate if the blocker has changed position after it has been attached.

The controller can indicate a changed position by recording the change of status. The indication can include storing the change of status in a memory. The device can comprise a memory internal or external to the controller. The indication can include at least one or transmitting a signal, illumination, generating a sound, creating a chemical reaction, and causing a smell.

The blocker functions by occluding a lens or sensor of the image recording apparatus. By occluding the image recording apparatus an image recorded by said apparatus will be detrimented such that it is incomplete, imperfect, flawed or in some other way worthless. Detrimenting an image recorded by said apparatus can include total occlusion or blocking of any image taken. By way of example, an image taken with a recording apparatus with the device as claimed attached will be completely blacked-out. Additionally or alternatively the blocker can function to result in an image taken by said apparatus being labelled. By way of example, an image taken with a recording apparatus with the device as claimed attached will have the word "stolen image" appearing in the recorded image.

The blocker can be electronically connected to the image recording apparatus. The blocker can alternatively be physically attached to the image recording apparatus. The blocker can be an attachment device such as a label or portion of tape. The blocker can be a sticker adapted for sticking over one or more image recording apparatus lens or sensor. The blocker can also be a clip.

The transducer can comprise a sensor configured to detect movement of the blocker from the attached position. The transducer can have a piezoelectric, resistance, heat, chemical and/or light component configured to detect any tampering action of the blocker.

The blocker can be attachable to the image recording apparatus such that removal of the blocker requires at least a portion of the blocker to be bent, leveraged or folded. The transducer is adapted to detect whenever the blocker is bent, leveraged or folded.

The transducer can be incorporated with the blocker that is attachable to the image recording apparatus and removal therefrom, after attachment, requires the blocker to be peeled off. The transducer is affected when the blocker is removed which reacts to the removal action.

The controller can have a transmitter configurable to transmit a signal from the device indicating that the blocker has been moved from an attached position to another position.

The controller can have receiver configured to receive an interrogation signal and is further configured to respond to said interrogation signal to indicate whether the blocker has changed position.

The device can further include a power source. Additionally or alternatively movement of the transducer, actuator or sensor can generate power to transmit a signal from the device indicating that the blocker has changed position. The force required to move the blocker from the attached position can generate power to operate the controller.

The device can additionally or alternatively be powered from a radio frequency antenna. The device can also be incorporated in a radio frequency identification (RFID) tag.

According to another aspect the invention resides in a device for attachment to an image recording apparatus comprising: a lens blocker adapted to block a camera lens of a camera device; a connector adapted to be connected to the lens blocker for connecting the lens blocker to the camera lens in a blocking position; a tampering sensor adapted to be connected to the lens blocker, the tampering sensor being adapted to have a first state when the lens blocker is in the blocking position and a second state when the lens blocker is in an unblocking position; a memory connected adapted to store a unique identifier of the device for attachment to an image recording apparatus; a control module adapted to be connected to the tampering sensor and to the memory, the control module being adapted to determine whether the lens blocker is in a blocking position or in an unblocking position based on the state of the tampering sensor and being further adapted to generate a notification signal comprising an indication of a tampering action and the device unique identifier when the lens blocker is determined to be in an unblocking position; a transmitter adapted to be connected to the control module for transmitting the notification signal to a remote receiver; and a battery adapted to supply power to the tampering sensor, the memory and to the control module.

The tampering sensor can be a light sensor adapted to have a first resistance when the sensor is in the first state and a second resistance different from the first resistance when the sensor is in the second state, the light sensor being adapted to change state from the first state to the second state upon exposure to light when the lens blocker is moved from the blocking position to the unblocking position.

The tampering sensor can be a piezoelectric device adapted to have a first resistance when the sensor is in the first state and a second resistance different from the first resistance when the sensor is in the second state, the piezoelectric sensor being adapted to change state from the first state to the second state upon application of a mechanical force on the sensor when the lens blocker is tampered from the blocking position to the unblocking position.

The piezoelectric sensor can be a piezoelectric sensor. The mechanical force can be in the form of a bending force applied on the sensor while tampering the lens blocker from the blocking position to the unblocking position.

The lens blocker can be in the form of a tag. The connector can be in the form of a sticker comprising an adhesive material adapted to adhere the lens blocker on the camera lens.

The transmitter can be an RFID transmitter. The remote receiver can be an RFID reader. The unique device identifier can be an RFID tag identifier.

The camera device can be part of a smart device comprising a smart device front side and a smart device back side, the camera lens comprising a front side camera lens on the front side of the smart device and a back side camera lens on the back side of the smart device, and the lens blocker comprising a front side lens blocker portion and a back side lens blocker portion respectively adapted to block the front side camera lens and the back side camera lens.

The front side lens blocker portion and the back side lens blocker portion can be connected there between using a bendable member adapted to be bendable about the side end of the smart device or about the top end of the smart device.

The device for attachment to an image recording apparatus of further can comprise a tag adapted to enclose the lens blocker, the connector, the tampering sensor, the control module, the transmitter, the memory and the battery, the lens blocker being defined by a portion of the tag and the connector being a tag sticker adapted to stick the lens blocker on the camera lens in the blocking position.

The tag sticker can be adapted to stick the entire tag on the camera device.

The tag can be made of a bendable material such that the tag is adapted to be bendable in order to move the lens blocker from the blocking position to the unblocking position.

The bendable material can include paper, rubber or plastic.

The device for attachment to an image recording apparatus can further comprise: a receiver adapted to be remotely connected to the transmitter for receiving the notification signal; an identifiers database adapted to map the unique device identifier to user identification information; and a reporting unit adapted to be connected to the receiver and to the identifiers database for receiving the notification signal, querying the database using the received device identifier enclosed in the notification signal for retrieving the user identification information, and for generating an alarm signal comprising the user identification information indicative of the tampering action.

The transmitter can be an RFID transmitter and the receiver can be an RFID reader.

As a further aspect of the invention, there is provided a tag sticker enclosing a sensor and a transmitter, the tag sticker being adapted to be adhered on an object in an adhesion position, the sensor being adapted to have a first state when the tag sticker is in an adhesion position and a second state when the tag sticker is not in an adhesion position, the transmitter being adapted to be triggered by the sensor to transmit a signal when the tag sticker is not in the adhesion position.

In an embodiment of the invention, the tag sticker further comprises a memory storing a tag identifier and a control module in communication with the sensor and the transmitter, the control module being adapted to generate the signal when the sensor is in the second state, the signal comprising the tag identifier.

In an embodiment of the invention, the sensor is a light sensor adapted to have a first resistance when the sensor is in the first state and a second resistance different from the first resistance when the sensor is in the second state, the light sensor being adapted to change state from the first state to the second state upon exposure to light when the tag sticker is not in the adhesion position.

In an embodiment of the invention, the sensor is a piezoelectric device adapted to have a first electrical state (e.g. current or voltage output) when the sensor is in the first state and a second electrical state different from the first electrical state when the sensor is in the second state, the piezoelectric sensor being adapted to change state from the first state to the second state upon application of a mechanical force on the sensor when the tag sticker is not in the adhesion position.

In an embodiment of the invention, the piezoelectric sensor is a bending piezoelectric sensor and wherein the mechanical force is in the form of a bending force applied on the sensor while the tag sticker is moved away from the adhesion position.

In an embodiment of the invention, the tag sticker is made of paper, plastic or rubber.

According to another aspect the invention resides in a device for attachment to an object for determining whether the device has been tampered with, the device having: a body, removably attachable to an object, and configured to maintain a substantially fixed form or shape when attached to an object; a transducer, connected to the body, configured to detect a change of form of the body; and an indicator, connected to the transducer, configured to store the position of the body when attached to an object and indicate if the body has changed position after it has been attached.

The transducer can detect the application of a mechanical force, causing the indicator to change or change status. The indicator can be a controller. The controller can have an electronic circuit. The controller can record the change of form or shape of the body. The indicator or controller can store the change of form or shape in a memory. The indicator or controller can include an output device including at least one of a transmitter for transmitting a signal, an illuminator, a sounder for generating a sound, chemicals for creating a chemical reaction such that a smell is created or a colour is changed.

The body can have an adhesive for adhesively attachment of the device to an object. The body can be in the form of a sticker.

The body can be substantially rigid when attached to an object. The body can be a tag. The body can be a tag and the tag can be attached to an object via a mechanical connection, such as a pin. The body can be a label. The body can be a label configurable to seal an envelope or package. The package can be a suitcase or luggage item. The device can be attached to a garment or fashion accessory or piece of jewelry.

The transducer or actuator can have a sensor configured to detect movement of the body from the attached position. The transducer can detect mechanical force.

The body can be attachable to an object such that removal of the body requires actuation of the transducer or actuator. The removal of the body from an object can require a force to be applied to the body. The force can cause the body to be bent, leveraged or folded. The transducer or actuator or sensor can have piezoelectric material.

The device can be configured such that indication of tampering occurs after a mechanical force has been applied to the body above a threshold level. Additionally or alternatively the device can be configured to record, as a result of tampering, at least one of: the level of force applied to the body; the length of time that a force was applied, the altitude of the device when the force occurred; and the temperature and/or ambient air pressure around the device.

The transducer or actuator or sensor can be incorporated with the body that is attachable to the object and removal therefrom, after attachment, requires the transducer of the device to be actuated. The body can enclose the transducer or actuator or sensor.

The controller can have a transmitter configurable to transmit a signal from the device indicating that the body has been moved from an attached position to another position.

The controller can have a receiver configured to receive an interrogation signal and is further configured to respond to said interrogation signal to indicate whether the body has changed position.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 5A illustrates the front side of the smart device showing a front side camera lens in accordance with a first embodiment of the present invention;

FIG. 5B illustrates the back side of the smart device showing a back side camera lens in accordance with a first embodiment of the present invention;

FIG. 5C illustrates the front side of the smart device showing a lens blocker tag blocking the front side camera lens in accordance with a first embodiment of the present invention;

FIG. 5D illustrates the back side of the smart device showing a lens blocker tag blocking the back side camera lens in accordance with a first embodiment of the present invention;

FIG. 7A illustrates the front side of the smart device showing a front side camera lens in accordance with a second embodiment of the present invention;

FIG. 7B illustrates the back side of the smart device showing a back side camera lens in accordance with a second embodiment of the present invention;

FIG. 7C illustrates the front side of the smart device showing a lens blocker tag blocking the front side camera lens in accordance with a second embodiment of the present invention;

FIG. 7D illustrates the back side of the smart device showing the lens blocker tag blocking the back side camera lens in accordance with a second embodiment of the present invention;

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION OF THE INVENTION

Figure 1:
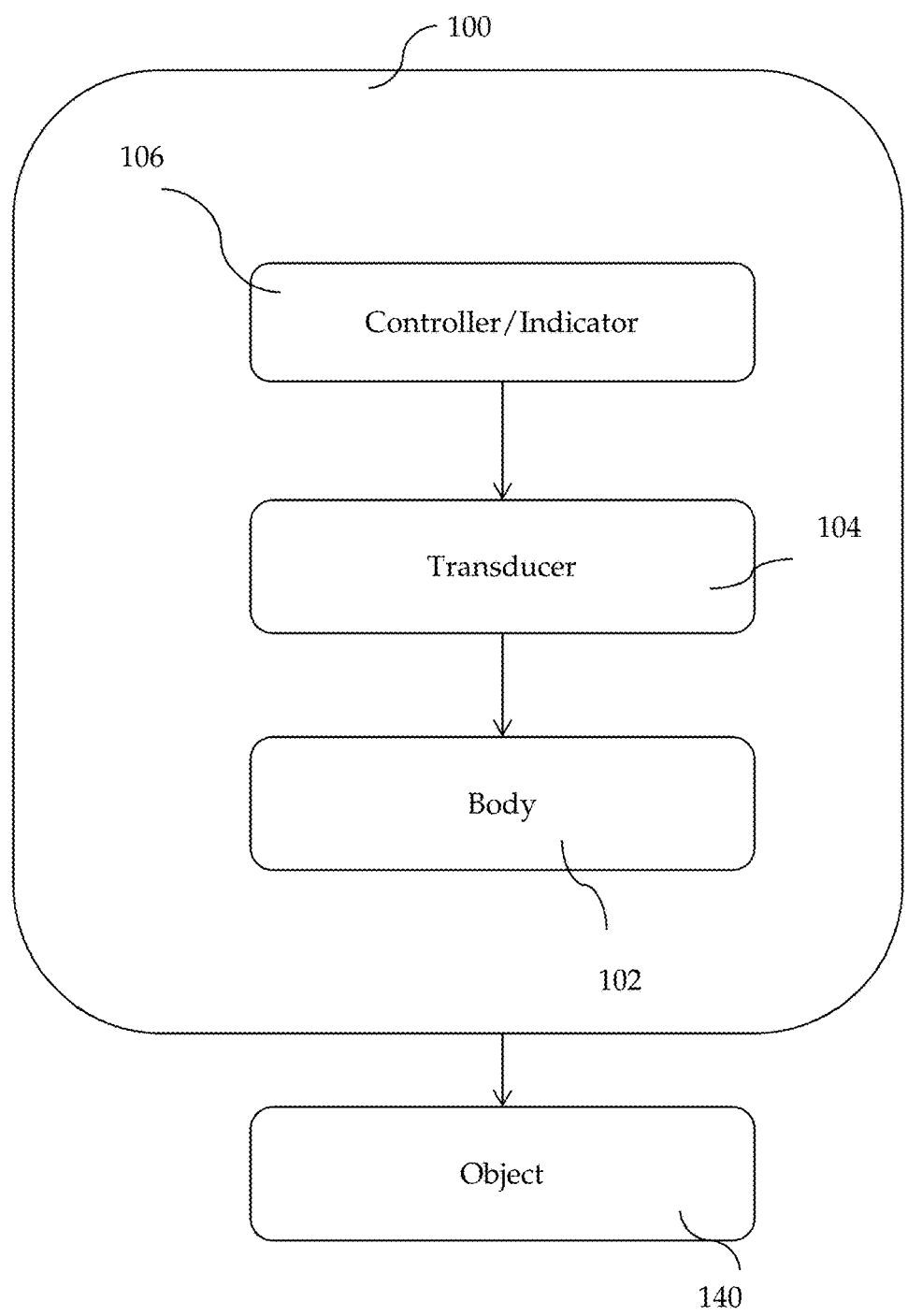
FIG. 1 is a block diagram illustrating a device for attachment to an image recording apparatus according to an embodiment of the present invention.

Referring to FIG. 1, there is provided a device 100 for attachment to an object 140 for determining whether the device has been tampered with. The device has a body 102, removably attachable to an object, and configured to maintain a substantially fixed form or shape when attached to an object. The object 140 can function to block a lens. A transducer 104 is provided, connected to the body 102, configured to detect a change of form of the body 102. The transducer 104 functions as a tampering sensor. An indicator 106, connected to the transducer 104 is configured to store the position of the body 102 when attached to an object 140 and indicate if the body 102 has changed position after it has been attached.

Figure 2:
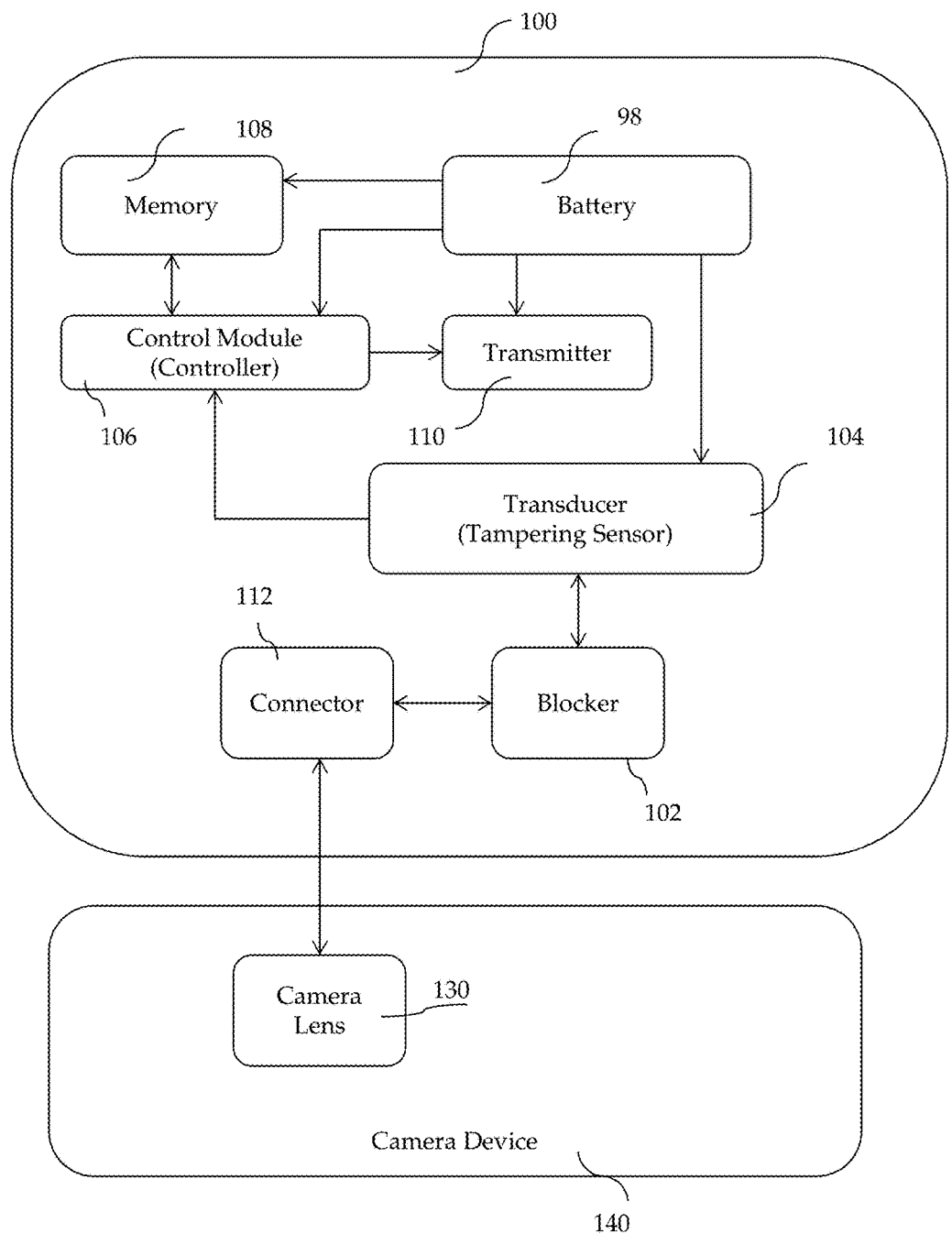
FIG. 2 is a block diagram illustrating a device for attachment to an image recording apparatus according to an embodiment of the present invention.

Referring to FIG. 2, according to an embodiment of the invention, there is provided a device for attachment to an image recording apparatus 100 comprising a battery 98, a lens blocker 102 (at least a part of the body takes the form of a lens blocker in this case), a tampering sensor 104 (a type of a transducer), a control module 106, a memory 108 (can be part of the controller 106 or a distinct component), a transmitter 110 and a connector 112. The device 100 is adapted to control use of a camera device 140 by being adapted to block the camera lens 130 of the camera device 140 using the lens blocker 102 and to detect any attempt of unblocking the camera lens 130 by a user using the tampering sensor 104 and the control module 106. The device 100 is also adapted to generate and transmit a notification signal comprising an indication of the tampering attempt and an identification of the device 100 being tampered to a remote receiver 142 using the control module 106 and the transmitter 110. The identifier of the device 100 is stored inside the memory 108 which is being retrieved by the control module 106. The connector 112 is adapted to couple the lens blocker 102 to the camera lens 130 of the camera device 140. The camera device 140 can be an independent standalone camera device or a camera device part of another electronic device such as a smart phone, a tablet, a laptop, a palmtop, and a pen camera.

In an embodiment of the invention, the lens blocker 102 is adapted to block the optical field of the camera lens 130 for restricting the camera lens 130 of capturing images. The lens blocker 102 is adapted to be positioned in a blocking position with respect to the camera lens 130 for blocking the camera lens 130 from capturing images. The tampering sensor 104 is adapted to be connected to the lens blocker 102 for detecting any tampering attempt of the lens blocker 102. The tampering sensor 104 is adapted to have a first state when the lens blocker 102 is in a first position and a second state when the lens blocker 102 is in a second position. The first position is when the lens blocker 102 is in a blocking position restricting the camera lens 130 from capturing images, whereas the second position is when the lens blocker 102 is in an unblocking position allowing at least partially the capture of images by the camera lens 130. The tampering sensor 104 is adapted to react differently based on whether the lens blocker 102 is in the first position or in the second position.

The control module 106 is adapted to be connected to the tampering sensor 104 for determining whether the tampering sensor 104 is in the first state or the second state and, based on this information, for determining whether the position of the lens blocker 102 has been tampered from the first blocking position to the second unblocking position. If the position of the lens blocker 102 is determined to be tampered, the control module 106 generates and transmits a notification signal notifying that the position of the lens blocker 102 has been tampered. The notification signal comprises an identifier of the device 100. The memory 108 of the device 100 is adapted to store a device identifier enabling for uniquely identifying the device 100.

The control module 106 is adapted to be connected to the memory 108 for retrieving the device identifier to be included in the notification signal. The transmitter 110 is adapted to be connected to the control module 106 for transmitting the notification signal to a remote receiver 142. The transmitter 110 comprises a wireless electrical antenna (not showed) adapted to transmit the notification signal to the remote receiver 142. The battery 98 is adapted to be connected to the electronic components of the device 100 requiring power supply. In an embodiment of the invention, the battery 98 is connected to the memory 108, the transmitter 110 and the control module 106. In an embodiment of the invention, the battery 98, memory 108, transmitter 110, and control module 106 are printed in an integrated circuit.

In an embodiment of the invention, the tampering sensor 104 is a light sensor which is adapted to change state based on the quantity of light it is exposed to. The light sensor is adapted to be coupled to the lens blocker 102 such that amount of light to which the light sensor is exposed to would vary depending on the position of the lens blocker 102. The variation of light amount leads to a variation in the resistance of the light sensor. This variation in the resistance of the light sensor is detected by the control module 106 which, based on this information, determines whether the lens blocker 104 has moved from a blocking position to an unblocking position.

In another embodiment of the invention, the tampering sensor 104 is a piezoelectric sensor. The piezoelectric sensor is adapted to produce an electric signal output when mechanical stress acts upon the sensor. The piezoelectric sensor is adapted to be coupled to the lens blocker 102 in such a manner that, after being positioned in blocking position, any attempt to alter the position of the lens blocker 102 would lead to a mechanical stress being applied on the piezoelectric sensor which would result in a variation of the electrical state of the sensor (e.g. the current or voltage output). This variation in the electrical state of the sensor is detected by the control module 106 which, based on this information, determines whether the lens blocker 104 has moved from a blocking position to an unblocking position.

The piezoelectric sensor can be a bending piezoelectric sensor which changes resistance based on the bending degree of the sensor. The bending piezoelectric sensor 104 is coupled to the lens blocker 102 in such a manner that it takes a first bending degree when the lens blocker 102 is in a blocking position and a second bending degree when the lens blocker 102 is in an unblocking position. In an example, the lens blocker 102 can take the shape of a tag adapted to cover the camera lens 102. In this case, the piezoelectric bending sensor 104 is coupled to the tag in a manner such that when the tag is used to cover the camera lens 130, the tag has an extended/straight posture without any flexion and so does the piezoelectric bending sensor 104. The tag is adapted such that the only way to remove the tag from the camera lens 140 (even partially) is through a flexion/bending action. This flexion/bending action of the tag results in the flexion/bending of the piezoelectric sensor 104 which results in a change of the electrical state of the sensor 104. This change of the electrical state is detected by the control module 106 which concludes to a tampering attempt of the lens blocker 104.

The control module 106 is adapted to detect the change of state of the tampering sensor 104 which corresponds in this case to the variation in the electric signal outputted by the tampering sensor 104, which in turn is based on the variation in the position of the lens blocker 102. When a variation in the electrical signal output is detected, the control module 106 obtains the unique device identifier from the memory 108, generates a notification signal comprising the unique device identifier and transmits the notification signal to the transmitter 110 for transmission to the remote receiver 142. The transmitter 110 comprises a wireless electrical antenna (not shown) for transmitting the notification signal to the remote receiver 142.

The connector 112 is adapted to connect the lens blocker 102 to the camera lens 130 of the camera device 140. The connector 112 is adapted to have a suitable structure in order to enable the lens blocker 102 to be positioned in a blocking position with respect to the camera lens 130. In an embodiment of the invention, the connector 112 can also be adapted to connect the whole device 100 to the camera device 140 while serving its primary function of positioning the lens blocker 102 in a blocking position with respect to the camera lens 130. The connector 112 can be in the form of an adhesive adapted to enable the lens blocker 102 to adhere to the camera lens 140 with the aid of an adhesive material. The connector 112 can also have a mechanical structure such as a clip adapted to enable such a purpose.

In an embodiment of the invention, the device 100 can take the form of a user tag comprising the different components, knowing the battery 98, the memory 108, the transmitter 110, the control module 106, the tampering sensor 104, the lens blocker 102 and the connector 112. The components of the device 100 can be embedded within the user tag. The electronic components can be implemented using any suitable technology such an integrated circuit board. The tag (or at least a part thereof) is used as the lens blocker 102 to which the tampering sensor 104 is connected. This connection between the tag and the sensor 104 can be conducted using an adhesive material. The connector 112 is preferably an adhesive label (sticker) adapted for adhering the tag to the camera lens 130. The part of the tag used as a lens blocker 102 and to which the tampering sensor 104 is connected is preferably made of a bendable material such as paper, rubber or plastic. The tag is preferably adapted to be in an extended position (without any flexion/bending) when it is adhered to the camera lens 130 (blocking position) and to be flexed/bended when it is being removed (at least partially) from the camera lens 130 (unblocking position).

The tampering sensor 104 is preferably a piezoelectric bending sensor in this case adapted to change the electrical state with the bending position of the tag (e.g. the current or voltage output). When the tag is being removed from the camera lens 130, the piezoelectric bending sensor is forced into a bending position which results in a variation of its electrical state. This variation of electrical state is detected by the control module 106 which interprets this action as an action/attempt to remove the lens blocker 104 from the camera lens 130. The control module 106 obtains the device identifier from the memory 108 and generates a notification signal with an indication of the device identifier and the tampering action/attempt to the transmitter 110 which transmits the notification signal using its integrated antenna (not shown) to the remote receiver 142.

The tempering sensor 104 can alternatively be a light sensor. When the tag is adhered to the camera lens 130 in a blocking position, the light sensor is hidden under the tag with no exposure to the light. When the tag is being removed from the camera lens 130, this leads in exposing the light sensor at least partially to the light coming from the environment. This exposure to the light results in a variation of the sensor resistance which is detected by the control module 106 and interpreted as an action/attempt to remove the lens blocker (tag in this case) 102 from the camera lens 130. The control module 106 therefore generates and sends a notification signal comprising the device identifier and an indication of the tampering action/attempt using through transmitter 110 to the remote receiver 142.

Figure 3:
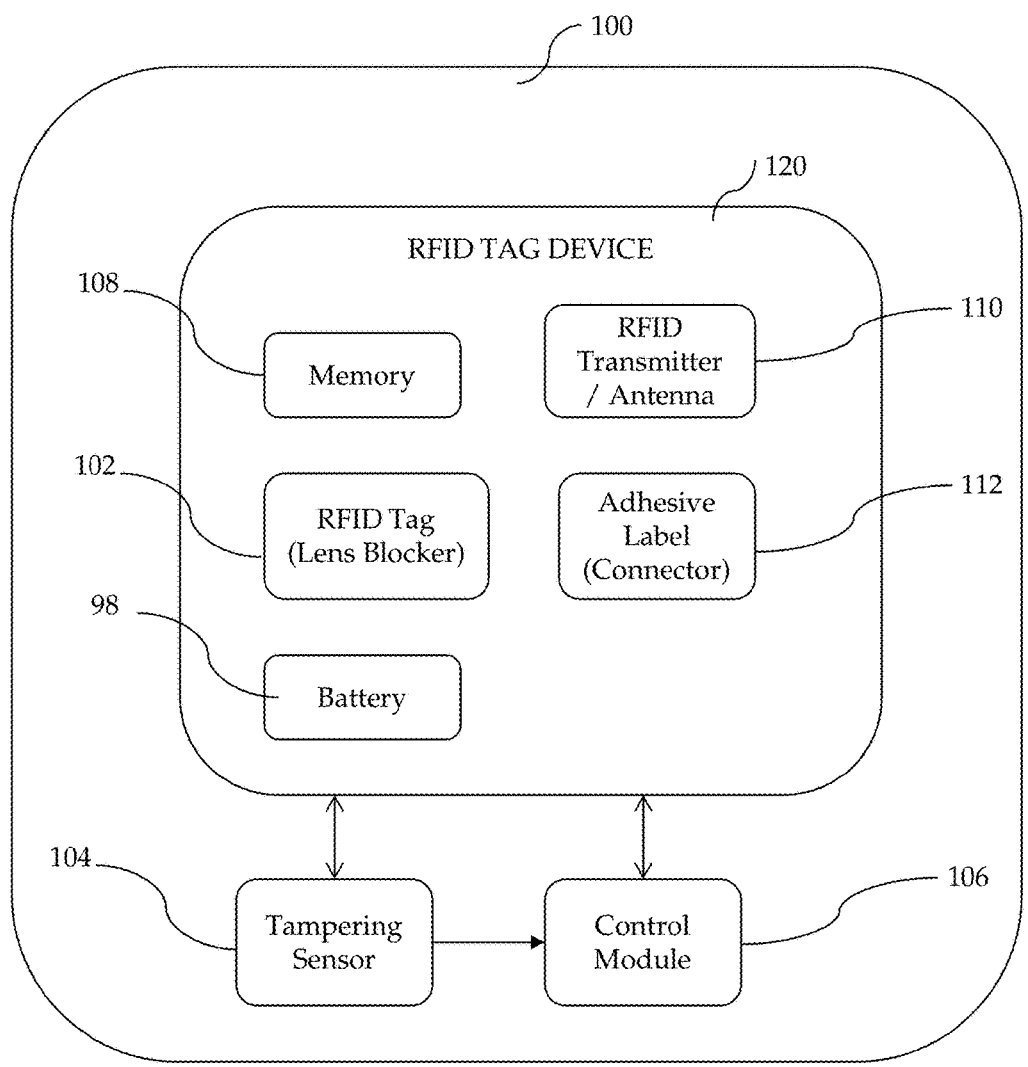
FIG. 3 is a block diagram illustrating a device for attachment to an image recording apparatus comprising an RFID tag device in accordance with an embodiment of the present invention.

As illustrated in FIG. 3, in an embodiment of the invention, Radio Frequency Identification (RFID) is used as a communication technology between the device 100 and the remote receiver 142. According to this embodiment, the device 100 comprises an RFID tag device 120. The RFID tag device 120 comprises a lens blocker in the form of an RFID tag 122, an RFID tag memory 126, an RFID transmitter (having an RFID antenna) 128, a connector in the form of an adhesive label 124 and a battery 129. The memory 126 stores a tag identifier (TID), a unique serial number assigned by the chip manufacturer, and comprises a memory bank to store the RFID tag device's unique tracking identifier (called an electronic product code or EPC).

The RFID transmitter 128 is adapted to generate and transmit an electrical signal comprising the TID to a remote RFID receiver 148 (see FIG. 8). The TID is used as the identifier of the device 100 in this case. The lens blocker 122 is an RFID tag which is made of an opaque material adapted to restrict passage of light to the camera lens 130 in order to prevent its use for capturing images. The opaque material can be made of paper, rubber, plastic, metal, or a composite material. The connector 124 is an adhesive label (such as a sticker) adapted to stick the lens blocker (tag) 122 on the camera lens 130. When the lens blocker (tag) 122 is adhered to the camera lens (130), the lens blocker (tag) 102 is considered to be in a blocking position.

The control module 106 and the tampering sensor 104 are adapted to be connected to the RFID tag device 120. The tampering sensor 104 is adapted to be connected to the lens blocker (tag) 122 such as any removal of the lens blocker (tag) 122 away from the camera lens 130 would result in changing the state of the tampering sensor 104 from the first state to the second state which would in turn lead to a variation of the resistance of the sensor 104. The variation of the resistance in the sensor 104 is detected by the control module 106. The control module 106 is adapted to be connected to the RFID transmitter 128 for triggering the transmitter 128 for sending a notification signal if a tampering attempt is determined by the control module 106. The RFID transmitter 128 sends a signal to the remote RFID receiver 148 comprising the TID. The transmission of the signal is an indication of the tampering of the lens blocker 102.

Figure 4:
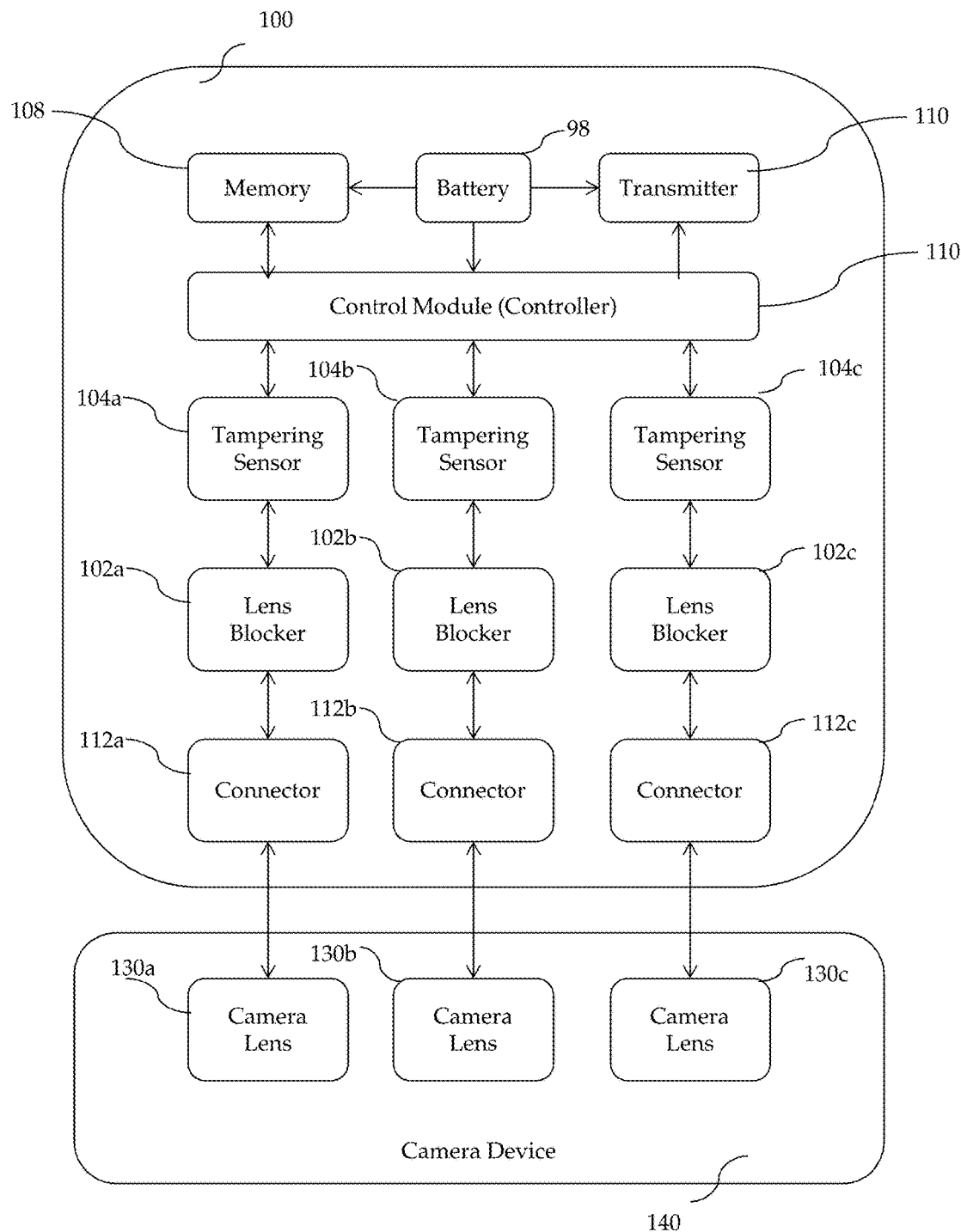
FIG. 4 is a block diagram illustrating a device for attachment to an image recording apparatus adapted to be used with a plurality of camera lenses in accordance with an embodiment of the present invention.

As shown in FIG. 4, the devices for attachment to image recording apparatuses 100 can be adapted to be used to control a plurality of camera lenses 130a, 130b & 130c simultaneously. This is for example when the camera device 140 comprises a plurality of camera lenses 130a, 130b & 130c. Most of today's smart devices have two camera lenses, one on a front side of the smart device and a second one on a back side of the smart device. The plurality of camera lenses 130a, 130b & 130c can be two camera lenses, three camera lenses or more.

According to an embodiment of the invention, the camera controlling device 100 comprises a plurality of lens blockers 102a, 102b & 102c adapted to be used to block the plurality of camera lenses 130a, 130b &130c. The plurality of lens blockers 102a, 102b & 102c can respectively be connected to a plurality of tampering sensors 104a, 104b & 104c. Depending on the mechanical form of the camera device 140 and the distance between the plurality of camera lenses 130a, 130b & 130c, a single tampering sensor can be sufficient. If it is the case, a single tampering sensor 104a, 104b or 104c is connected to the plurality of the lens blockers 102a, 102b & 102c. This design option, when practically suitable, results in cost reduction in the manufacturing of the device 100. The plurality of lens blockers 102a, 102b & 102c can consist of a same physical unit or, alternatively, can be separate physical units.

As illustrated in FIGS. 5 to 8, a tag can be used to house the device 140. At least a part of the tag is used as a lens blocker 102. The same lens blocker tag 102a & 102b can be used to cover a plurality of camera lenses 130a & 130b. The lens blocker tag 102a & 102b will however be adapted to have a suitable structure and dimensions for blocking the plurality of camera lenses 130a & 130b. In the example illustrated in FIGS. 4 to 7, the smart device illustrated comprises two camera lenses 130a & 130b. The device 140 is embedded within a tag form structure as illustrated above as a possible embodiment of the present invention. The camera lenses 130a & 130b are respectively located in the front and back side of the smart device. The device for attachment to an image recording apparatus 100 adapted to be connected to a camera device 140 in a smart device such as a mobile phone device in accordance with one embodiment of the invention. The device 100 is adapted to have a suitable form and structure based on the mobile device 140 to which it is coupled.

In an embodiment of the invention, as illustrated in FIG. 5, the lens blocker tag 102a & 102b is adapted to cover both camera lenses 130a & 130b by being extendable about the top end of the smart device. FIG. 5A illustrates the front side of the smart device showing a front side camera lens 130a. FIG. 5B illustrates the back side of the smart device showing a back side camera lens 130b. FIG. 5C illustrates the front side of the smart device showing a lens blocker tag 102a blocking the front side camera lens 130a. FIG. 5D illustrates the back side of the smart device showing a lens blocker tag 102b blocking the back side camera lens 130b.

Figure 6A:
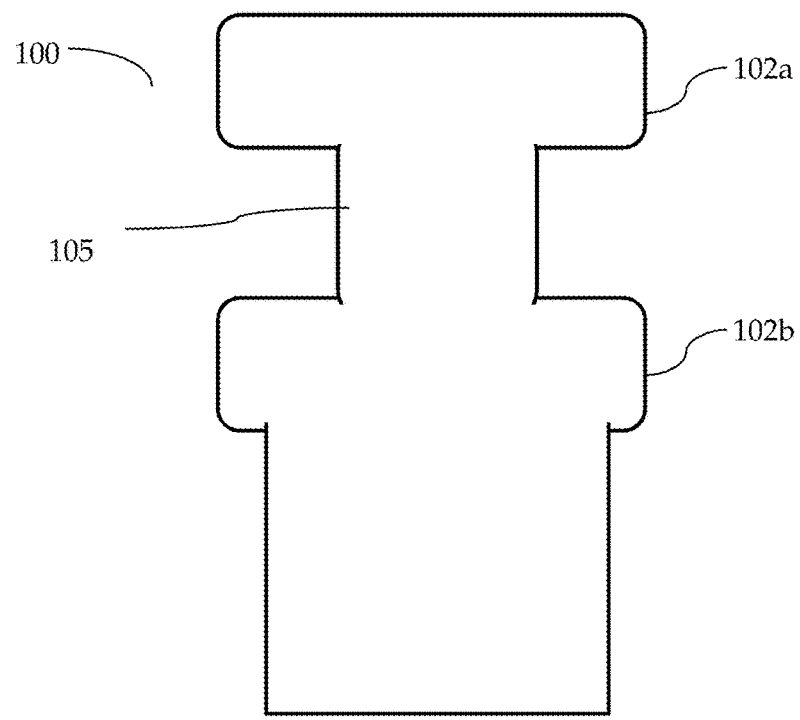
FIG. 6A and FIG. 6B show respectively an external view and an internal view of a tag embodying the device in accordance with a first embodiment of the present invention.
Figure 6B:
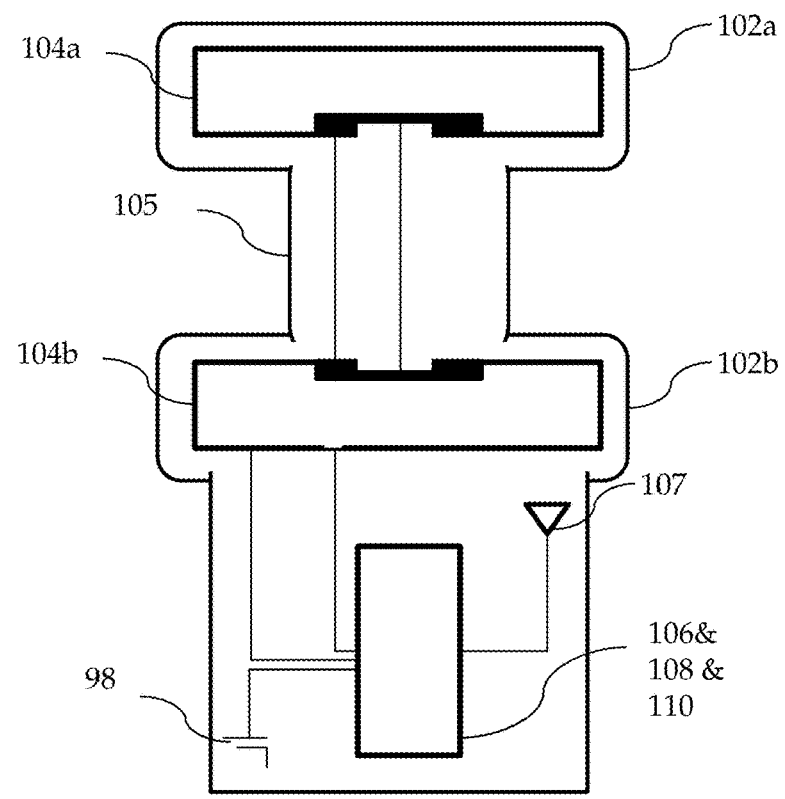

As illustrated in FIGS. 6A and 6B, the lens blocker tag 102a & 102b can be a single physical unit having a first lens blocker portion 102a, a second lens blocker portion 102b and a connection (such as a strip) connecting the first and second portions 102a & 102b. The first lens blocker portion 102a is adapted to be connected to the front side of the mobile device in a manner capable of blocking the front side camera lens 130a entirely. The second lens blocker portion 102b is adapted to be connected to the back side of the mobile device in a manner capable of blocking the back side camera lens 130b entirely. A bendable strip 105 is provided between the first lens blocker portion 102a and the second lens blocker portion 102b. The bendable strip 5 is adapted to extend between the first and second lens blocker portions 102a & 102b about the top end of the mobile device.

FIG. 6A and FIG. 6B show respectively an external view and an internal view of the tag embodying the device 100. As showed in FIG. 5b, a first tampering sensor 104a is coupled to the first lens blocker portion 102a, where a second tampering sensor 104b is coupled to the second lens blocker portion 102b. The control module 106, the memory 108 and the transmitter 110 are printed in an integrated circuit (IC) connected to an antenna 107. The sensors 104a & 104b as well as the IC 106, 108 & 110 are connected to a battery 98. The strip 105 is adapted to be flexed about the top end of the mobile device. The connector 112 is preferably in the form of adhesive material. Preferably, the connector 112 is in the form of a sticker.

In an embodiment of the invention, as illustrated in FIG. 7, the lens blocker tag 102 is adapted to cover both camera lenses 130a & 130b by being extendable about the side section of the smart device. FIG. 7A illustrates the front side of the smart device showing a front side camera lens 130a. FIG. 7B illustrates the back side of the smart device showing a back side camera lens 130b. FIG. 7C illustrates the front side of the smart device showing a lens blocker tag 102a blocking the front side camera lens 130a. FIG. 7D illustrates the back side of the smart device showing the lens blocker tag 102b blocking the back side camera lens 130b.

Figure 8A:
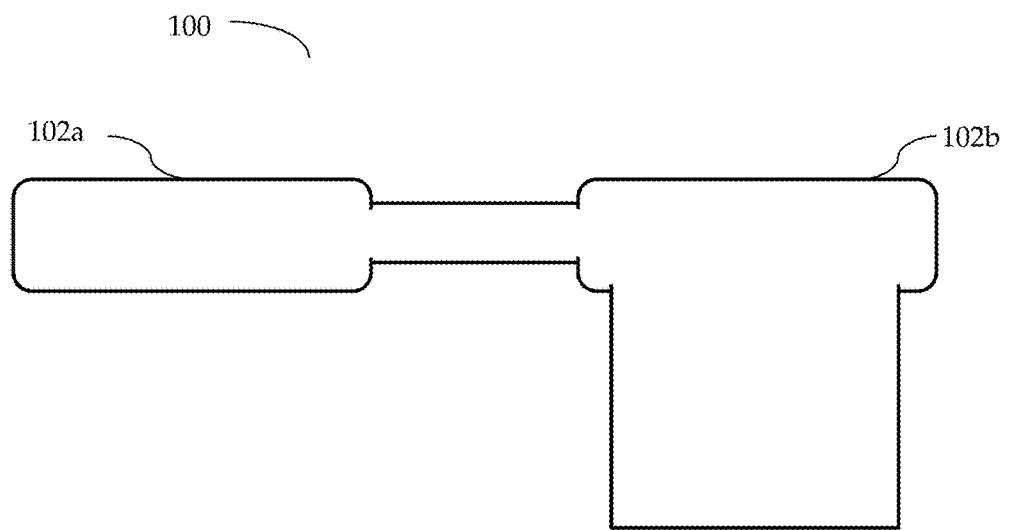
FIG. 8A and FIG. 8B show respectively an external view and an internal view of a tag embodying the device in accordance with a second embodiment of the present invention.
Figure 8B:
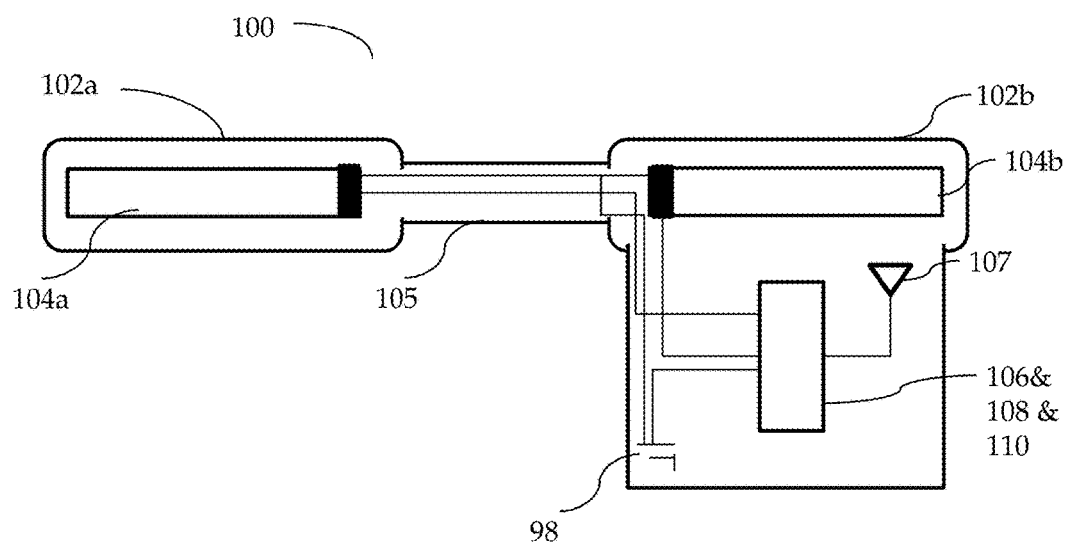

As illustrated in FIGS. 8A and 8B, the lens blocker tag 102a & 102b can be a single physical unit having a first lens blocker portion 102a, a second lens blocker portion 102b and a connection (such as a strip) connecting the first and second portions 102a & 102b. The first lens blocker portion 102a is adapted to be connected to the front side of the mobile device in a manner capable of blocking the front side camera lens 130a entirely. The second lens blocker portion 102b is adapted to be connected to the back side of the mobile device in a manner capable of blocking the back side camera lens 130b entirely. A bendable strip 105 is provided between the first lens blocker portion 102a and the second lens blocker portion 102b. The bendable strip 5 is adapted to extend between the first and second lens blocker portions 102a & 102b about a side end of the mobile device.

FIG. 8A and FIG. 8B show respectively an external view and an internal view of the tag embodying the device 100. As showed in FIG. 7B, a first tampering sensor 104a is coupled to the first lens blocker portion 102a, where a second tampering sensor 104b is coupled to the second lens blocker portion 102b. The control module 106, the memory 108 and the transmitter 110 are printed in an integrated circuit (IC) connected to an antenna 107. The sensors 104*a* & 104*b* as well as the IC 106, 108 & 110 are connected to a battery 98. The strip 105 is adapted to be flexed about the top end of the mobile device. The connector 112 is preferably in the form of adhesive material. Preferably, the connector 112 is in the form of a sticker.

Figure 9:
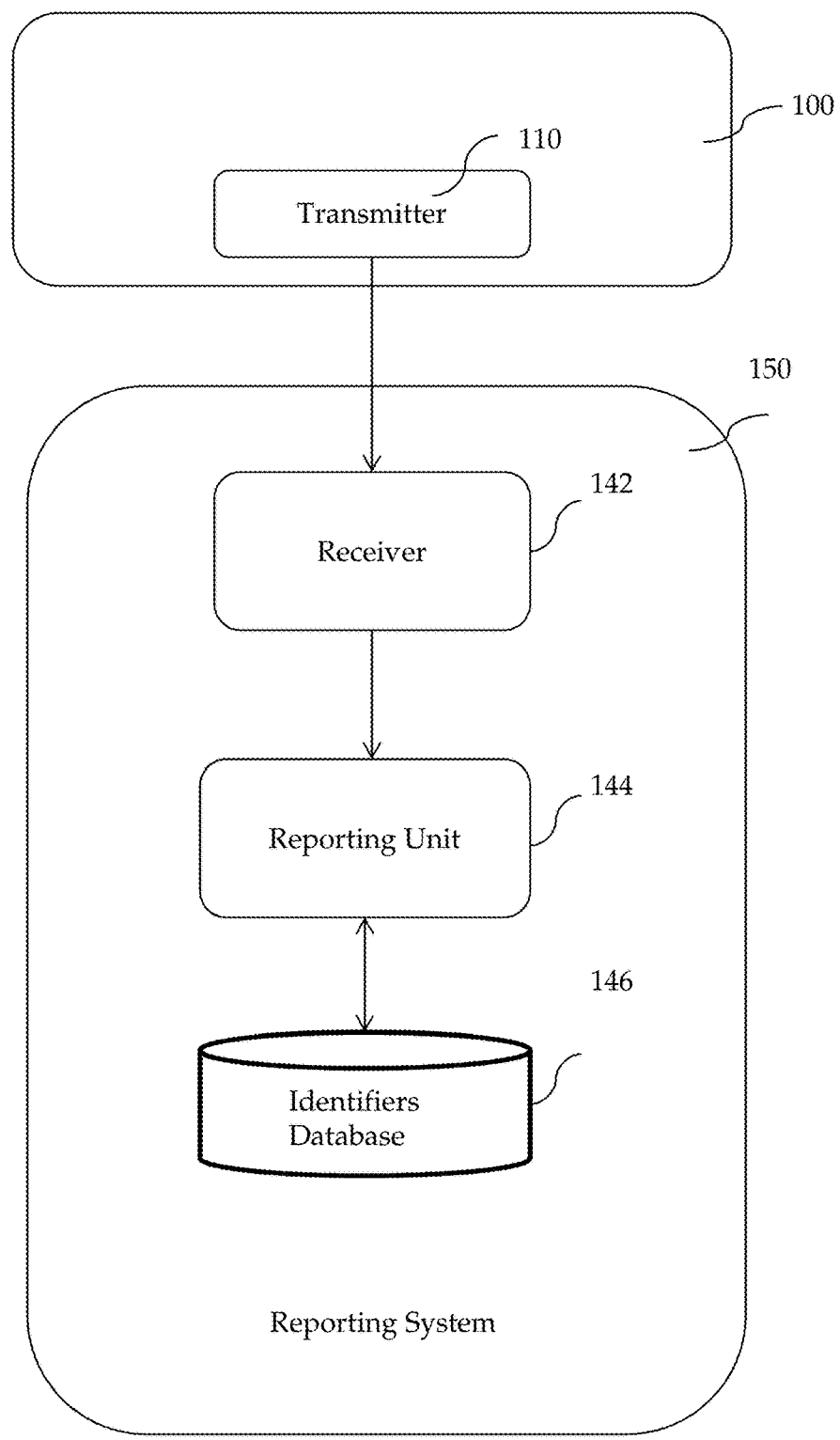
FIG. 9 is a block diagram illustrating a reporting system in accordance with an embodiment of the present invention.

As illustrated in FIG. 9, there is provided a reporting system 150 comprising a reader 142, a reporting unit 144 and an identifiers database 146. The reporting system 150 is adapted to be connected to the device for attachment to an image recording apparatus 100. The purpose of the reporting system 150 is to receive notification signals from the control device 100 notifying about any tampering attempt/action of the lens blocker 102, to determine the user associated with the device 100 and to generate and report the tampering attempt/action to an administrator of the reporting system 150.

The receiver 142 of the reporting system 150 is adapted to be wirelessly connected to the transmitter 110 of the control device 100. The receiver 142 first receives the notification signal from the transmitter 110. The receiver 142 is adapted to be connected to the reporting unit 144 for transmitting thereto the notification signal received. The reporting unit 144 is adapted to be connected to the identifiers database 146 for inquiring about the user associated with the device 100 from which the notification message has been received. This query is conducted based on the device identifier received in the notification message.

The identifiers database 146 is adapted to store data mapping device identifiers to users. In fact, there is unique device identifier associated with each control device 100. At the time of allocating the control device 100 to a user, the unique device identifier associated with the allocated device 100 is being stored inside the identifiers database 146 in association with identification information of the user which can comprise for example user's name, address and picture. When a notification signal is received by the reporting unit 144, the notification signal comprises a device identifier which is used by the reporting unit 144 to query the identifiers database 146.

As device identifiers are mapped to users' identification information inside the database 146, the reporting unit 144 receives back from the database 146 identification information of the user associated with the device having the queried device identifier. The reporting unit 144 generates and transmits an alarm signal comprising the user identification information. The alarm signal is indicative of the tampering action/attempt being conducted by the user identified using the database 146. In an embodiment of the invention, the reporting unit 144 is adapted to be connected to a display device for displaying information about the tampering attempt/action comprising the user identification information. The display device can be associated with a mobile device, a palmtop, a wireless tablet, a wired computing system or a TV screen for example. In another embodiment of the invention, the reporting unit 144 is adapted to be connected to an administrator (such as a security guard) mobile device for reporting thereto the tampering attempt/action along with the user identification information. A mobile application can be provided on the administrator mobile device for receiving and processing the messages received from the reporting unit 144. The processing comprises displaying the messages to the administrator through a user interface of the mobile device.

Figure 10:
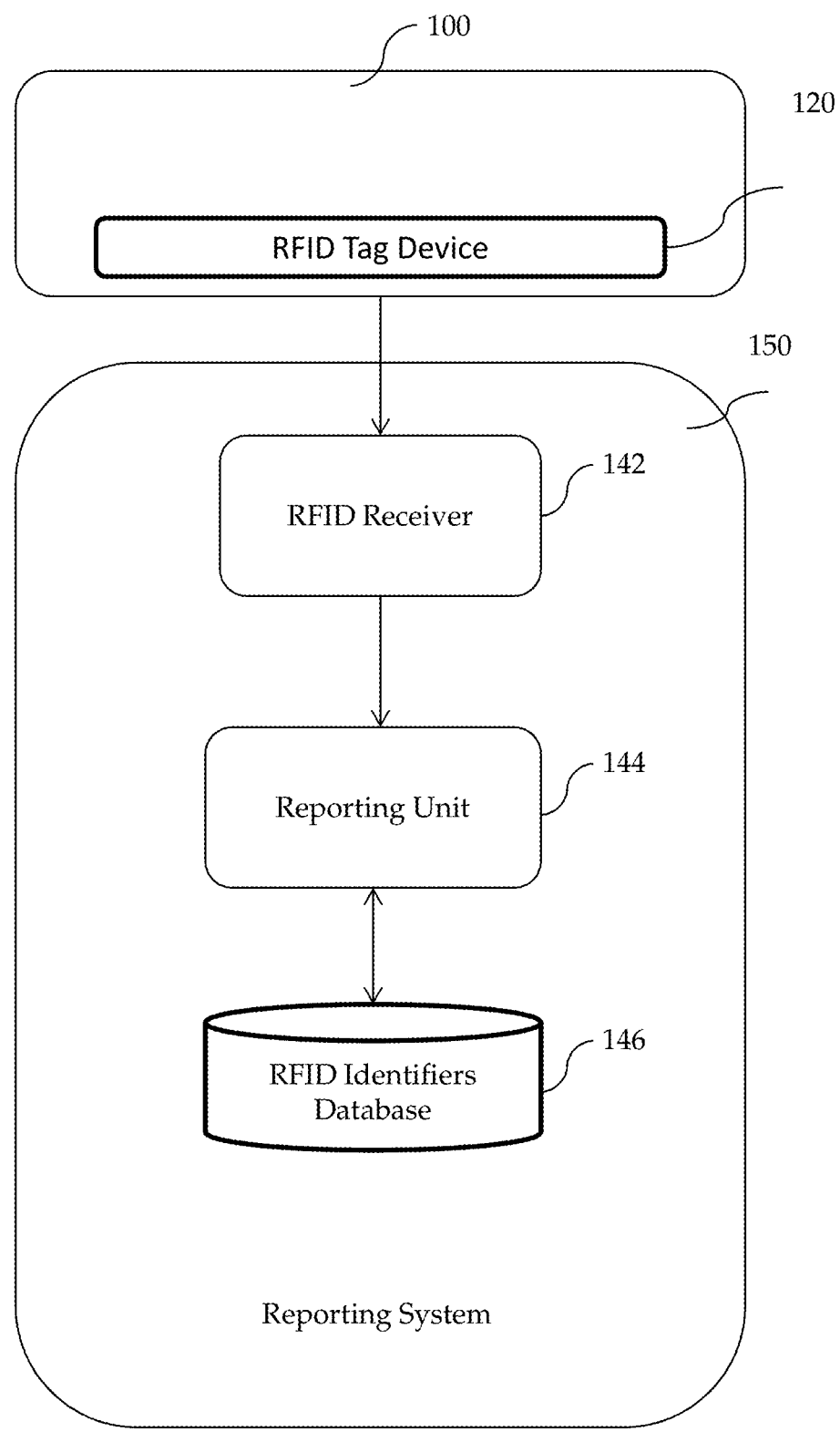
FIG. 10 is a block diagram illustrating a reporting system adapted to use an RFID technology in accordance with an embodiment of the present invention.

FIG. 10 illustrates a reporting system 150 adapted to be used with an RFID technology when the control device 100 uses the RFID technology for communication with the reporting system 150. According to this embodiment, the reporting system comprises an RFID receiver 142 adapted to be in communication with the RFID transmitter 110 of the RFID tag device 120. The reporting system 150 further comprises a reporting unit 144 and an RFID identifiers database 146 adapted to store RFID tag identifiers associated with RFID tag devices 120 being allocated to users. The RFID receiver 142 is adapted depending on whether the RFID tag devices 120 used are active, passive or semi-passive devices.

Figure 11:
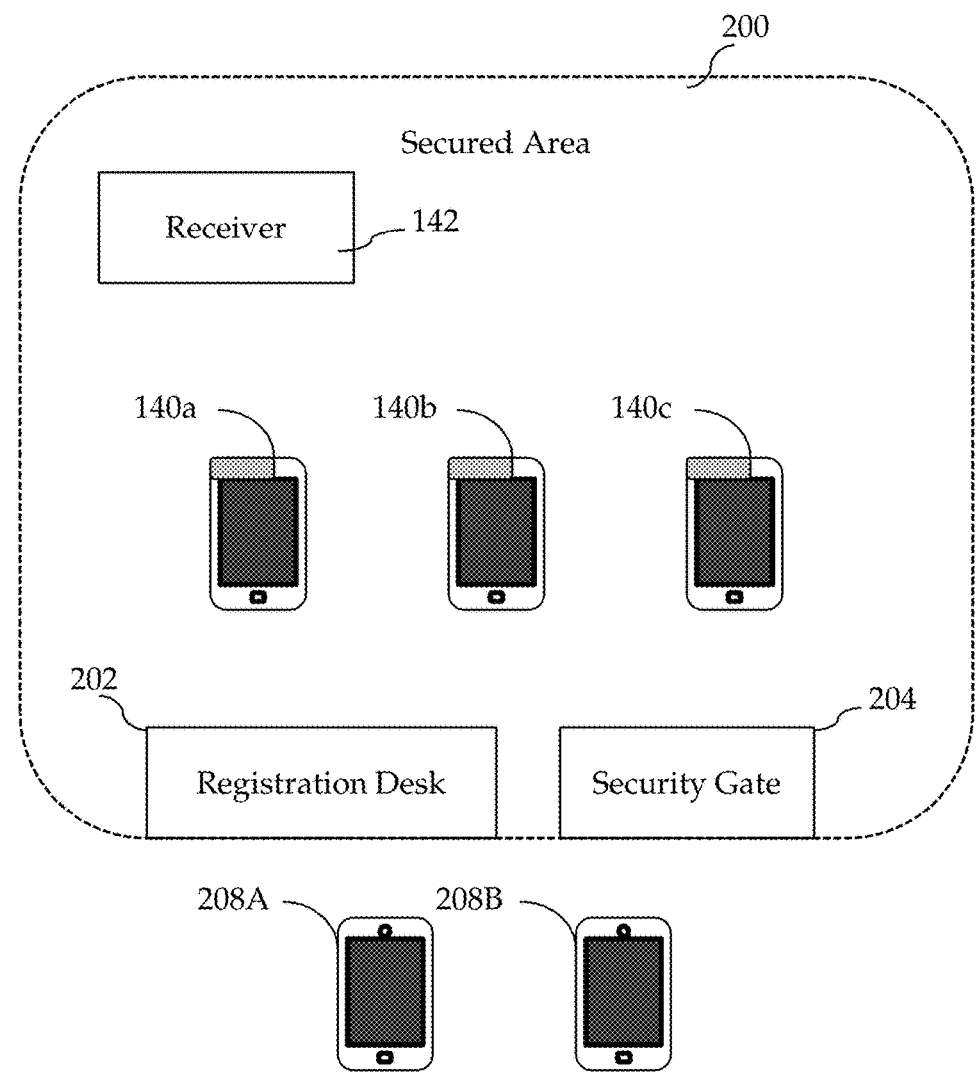
FIG. 11 illustrates a secured area comprising smart devices secured using devices for attachment to image recording apparatuses in accordance with an embodiment of the present invention.

FIG. 11 illustrates a secured area 200 adapted to receive devices for attachment to image recording apparatuses 100 in communication with a reporting system 150 in accordance with an embodiment of the present invention. The secured area 200 may be any type of geographical area within which the use of cameras 140 needs to be restricted. A receiver 142 is mounted inside the secured area 200. The receiver 142 is adapted to be in communication with the devices for attachment to image recording apparatuses 140*a*, 140*b* & 140*c* located within the secured area 200. The receiver 142 can be an RFID reader for example, and in this case the device for attachment to an image recording apparatus 100 comprise RFID tag devices 120 adapted to be in communication with the RFID reader 142. A registration desk 202 and a security gate 204 are preferably provided. A user of a camera device 140 is first directed to the registration desk 202 for completing the registration process before being granted access inside the secured area 200. A device for attachment to an image recording apparatus 100 is provided to the user by an administrator of the secure area 202 (such as a security guard for example). The device for attachment to an image recording apparatus 100 is coupled to the camera device 140 in a manner to block the camera lens 130 for restricting its use within the secured area 200. The device identifier associated with the device for attachment to an image recording apparatus is then stored inside the identifiers database 146 along with user identification information. This is being conducted by the administrator of the secured area 202.

The coupling of the security device 100 to the camera device 140 is then checked at the security gate 204. The security gate 204 can be the same physical unit as the registration desk 202. A user in possession of a camera device 140 is checked at the security gate 204 to make sure that the camera device 140 is secured with the device for attachment to an image recording apparatus 100. Subsequent to the checking process, the user is allowed to enter the secured area 202. Users carrying unsecured camera devices 208A-208B are not allowed access inside the secured area 200.

Figure 12:
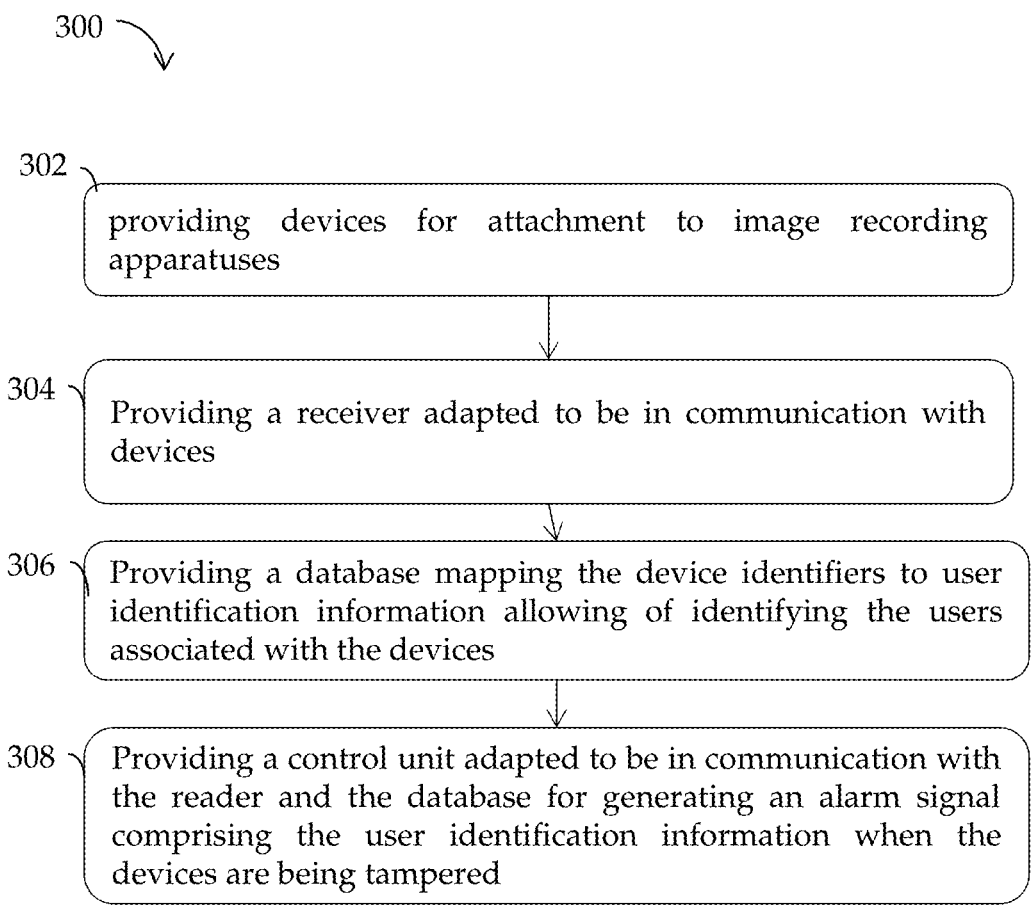
FIG. 12 illustrates a method of controlling camera lenses of camera devices in accordance with an embodiment of the present invention.

As a further aspect of the invention, as illustrated in FIG. 12, there is provided a method of controlling use of cameras in a secured area (300). The method comprises:

providing devices for attachment to image recording apparatuses adapted to restrict use of image recording apparatuses (such as camera devices) to users in accordance with any one of the embodiments of the present invention (302);

providing a receiver in accordance with any one of the embodiments of the present invention, the receiver being adapted to be in communication with the devices for attachment to the image recording apparatuses for receiving notification messages from the I devices of any tampering action/attempt of the control devices to unblock the camera lenses of the camera devices (304);

providing an identifiers database in accordance with any-one of the embodiments of the present invention, the receiver being adapted for mapping device identifiers associated with the provided control devices to user identification information associated with users to whom the control devices have been provided (306); and providing a control unit in accordance with any one of the embodiments of the present invention, the control unit being adapted to be in communication with the receiver and the database for generating an alarm signal comprising user identification information associated to control devices being tampered (308).

As a further aspect of the invention, there is provided a secured area equipped with devices for attachment to image recording apparatuses and a reporting system in communication with the devices in according with any one of the embodiments of the present invention.

As a further aspect of the invention, there is provided a tag sticker enclosing a sensor and a transmitter, the tag sticker being adapted to be adhered on an object in an adhesion position, the sensor being adapted to have a first state when the tag sticker is in an adhesion position and a second state when the tag sticker is not in an adhesion position, the transmitter being adapted to be triggered by the sensor to transmit a signal when the tag sticker is not in the adhesion position.

In an embodiment of the invention, the tag sticker further comprises a memory storing a tag identifier and a control module in communication with the sensor and the transmitter, the control module being adapted to generate the signal when the sensor is in the second state, the signal comprising the tag identifier.

In an embodiment of the invention, the sensor is a light sensor adapted to have a first resistance when the sensor is in the first state and a second resistance different from the first resistance when the sensor is in the second state, the light sensor being adapted to change state from the first state to the second state upon exposure to light when the tag sticker is not in the adhesion position.

In an embodiment of the invention, the sensor is a piezoelectric device adapted to have a first resistance when the sensor is in the first state and a second resistance different from the first resistance when the sensor is in the second state, the piezoelectric sensor being adapted to change state from the first state to the second state upon application of a mechanical force on the sensor when the tag sticker is not in the adhesion position.

In an embodiment of the invention, the piezoelectric sensor is a bending piezoelectric sensor and wherein the mechanical force is in the form of a bending force applied on the sensor while the tag sticker is moved away from the adhesion position.

In an embodiment of the invention, the tag sticker is made of paper, plastic or rubber.

The tag sticker can be adapted to be used in a variety of applications, including but not limited to control the camera lenses of camera devices.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

The invention claimed is:

1. A device for attachment to an image recording apparatus, the device comprising: a blocker, attachable to said image recording apparatus, for inhibiting said apparatus from recording an image when attached thereto; a transducer, connected to the blocker, for detecting a change of position of the blocker between an attached position, wherein said apparatus is inhibited, and another position; and—a controller, connected to the transducer, for storing the position of the blocker when attached to said image recording apparatus and indicate indicating if the blocker has changed position after it has been attached; and— wherein the blocker is a sticker for sticking over one or more image recording apparatus lens or sensor.

2. The device according to claim 1, wherein the tag sticker is made of paper, plastic or rubber.

3. The device according to claim 1, wherein the transducer comprises a sensor for detecting movement of the blocker from the attached position.

4. The device according claim 1, wherein the blocker is attachable to the image recording apparatus such that removal of the blocker requires at least a portion of the blocker to be bent, leveraged or folded.

5. The device according to claim 1, wherein the transducer comprises a piezoelectric sensor.

6. The device according to claim 1, wherein the piezoelectric sensor is subject to a mechanical force and to react to said mechanical force when the blocker moves from the attached position to another position.

7. The device according to claim 6, wherein the piezoelectric sensor is a bending piezoelectric sensor and wherein the mechanical force is in the form of a bending force applied on the sensor while moving the blocker from the attached position to the other position.

8. The device according to claim 1, wherein the transducer comprises a light sensor.

9. The device of claim 8 wherein the light sensor has a first resistance when the blocker is in the attached position and a second resistance different from the first resistance when the blocker is in another position, the light sensor changes resistance from the first resistance to the second resistance upon exposure to light when the blocker is moved from the attached position to the other position.

10. The device according to claim 1, wherein the transducer is incorporated with the blocker that is attachable to the image recording apparatus and removal therefrom, after attachment, requires the blocker to be peeled off.

11. The device according to claim 10, wherein the controller has a transceiver for receiving an interrogation signal and for responding to said interrogation signal to indicate whether the blocker has changed position.

12. The device according to claim 1, wherein the controller has a transmitter configurable to transmit a tampering signal from the device indicating that the blocker has been moved from an attached position to another position.

13. The device according to claim 12 further comprising a memory for storing a unique device identifier of the image recording a apparatus, wherein the controller indicates the unique device identifier in the tampering signal.

14. The device according to claim 13, wherein the transducer is incorporated in the blocker, the blocker is an RFID tag, the transceiver is an RFID transceiver and the unique identifier is an RFID tag identifier.

15. The device according to claim 13 further comprising:

a central reader remotely connected to the device transmitter for receiving the tampering signal;

an identifiers database to map the unique identifier to user identification information;

a reporting unit connected to central reader and to the identifiers database for receiving the tampering signal, querying the database using the received unique identifier for retrieving the user identification information, and for generating an alarm signal comprising the user identification information indicative of a tampering action of the blocker.

16. The device according to claim 1 wherein the controller indication is at least one of transmitting a tampering signal, illumination, generating a sound, creating a chemical reaction and causing a smell.

17. The device according to claim 1 further comprising a battery which supplies power to the transducer and the controller.

18. The device according to claim 17, wherein the front side lens blocker portion and the back side lens blocker portion are connected there between using a bendable member that is bendable about the side end of the smart device or about the top end of the smart device.

19. The device according to claim 1, wherein the image recording apparatus is a camera having a camera lens part of a smart device comprising a smart device front side and a smart device back side, the camera lens comprising a front side camera lens on the front side of the smart device and a back side camera lens on the back side of the smart device, and the blocker comprising a front side lens blocker portion and a back side lens blocker portion respectively to block the front side camera lens and the back side camera lens.

* * * * *